(12) United States Patent
Rabie

(10) Patent No.: US 12,702,954 B2
(45) Date of Patent: Aug. 11, 2026

(54) LIQUID-FILTRATION MEMBRANE AND MODULE, AND METHOD FOR MAKING

(71) Applicant: HMT Technologies Inc., Mississauga (CA)

(72) Inventor: Hamid Rabie, Mississauga (CA)

(73) Assignee: HMT Technologies Inc., Mississauga (CA)

( * ) Notice: Subject to any disclaimer, the term of this patent is extended or adjusted under 35 U.S.C. 154(b) by 281 days.

(21) Appl. No.: 18/747,771

(22) Filed: Jun. 19, 2024

(65) Prior Publication Data

US 2025/0387755 A1 Dec. 25, 2025

(51) Int. Cl.
*B01D 65/00* (2006.01)
*B01D 63/02* (2006.01)

(52) U.S. Cl.
CPC ......... *B01D 65/003* (2013.01); *B01D 63/021* (2013.01); *B01D 63/024* (2013.01); *B01D 2313/042* (2022.08)

(58) Field of Classification Search
CPC ............ B01D 63/024; B01D 2313/042; B01D 65/003; B01D 63/021
See application file for complete search history.

(56) References Cited

U.S. PATENT DOCUMENTS 9,498,753 B2 11/2016 Johnson et al.
9,968,888 B2 5/2018 Johnson et al.

FOREIGN PATENT DOCUMENTS

CN 101972606 A * 2/2011

* cited by examiner

*Primary Examiner* — Carson Gross
(74) *Attorney, Agent, or Firm* — Aird & McBurney LP

(57) ABSTRACT

A method is provided for sealing a first end of a plurality of liquid-filtration membranes, each having a hollow tubular shape. The method comprises:

providing adhesive in a storage vessel;
immersing the first ends of the liquid-filtration membranes into the adhesive up to a first length;
applying a driver liquid above the adhesive, wherein the driver liquid is less dense than the adhesive, such that a weight of the driver liquid applies a force so as to drive adhesive into an interior of each liquid-filtration membrane up to a second length along the first ends, that is greater than the first length;
removing at least some of the driver liquid;
solidifying the adhesive;
cutting the plurality of liquid-filtration membranes at a point that is between the first length and the second length such that the first ends of the liquid-filtration membranes are disconnected from one another.

15 Claims, 7 Drawing Sheets

22
25
24
30
28
14
29
26

10
72
14
14
14
70
68
16
12
74
16
18
20
28
66
16
16
22
24
14
29
26

14
14
22
25
24
26
32
L2, L2S
30
L1, L1L 14, 14b
28
14, 14a
22
25
24
26
32
L2, L2S
30
L1, L1L
L2

14
28
14
22
25
24
29
26
40
40
30

14
28
14
22
25
24
26
L2, L2S
30
L1, L1L

LIQUID-FILTRATION MEMBRANE AND MODULE, AND METHOD FOR MAKING

FIELD OF THE INVENTION

The present invention relates to liquid-filtration membranes and more particularly to liquid-filtration membranes that are sealed at one end and membrane modules that employ such liquid-filtration membranes.

BACKGROUND OF THE INVENTION

Hollow fiber, liquid-filtration membranes are known in the art. Some liquid-filtration systems employ liquid-filtration membranes that are sealed at one end, and are open at the other end. It is difficult to produce such liquid-filtration membranes easily and cost-effectively. There exists a need for new ways to make such liquid-filtration membranes, and for new liquid-filtration membranes that have one end sealed, while ensuring that the sealed ends are not all adhered to one another, so that they are free to move relative to one another. There exists a further need to produce liquid-filtration membrane modules that include a plurality of such membranes.

SUMMARY OF THE DISCLOSURE

In an aspect, the disclosure is directed to a method for sealing a first end of each of a plurality of liquid-filtration membranes, wherein the liquid-filtration membranes each have a hollow tubular shape, the method comprising:
- providing a quantity of an adhesive in a storage vessel;
- immersing the first ends of the plurality of liquid-filtration membranes into the adhesive up to a first length along the first ends;
- applying a quantity of a driver liquid above the quantity of the adhesive in the storage vessel, wherein the driver liquid is less dense than the adhesive, such that a weight of the driver liquid applies a force on the adhesive so as to drive some of the adhesive into an interior of each of the plurality of liquid-filtration membranes up to a second length along the first ends, wherein the second length is greater than the first length;
- removing at least some of the driver liquid from the storage vessel;
- solidifying the adhesive; and
- cutting the plurality of liquid-filtration membranes at a point that is between the first length and the second length such that the first ends of the plurality of liquid-filtration membranes are disconnected from one another.

In another aspect, the disclosure is directed to a method for making a membrane module for use in liquid filtration, the method comprising:
- providing a quantity of an adhesive in a storage vessel;
- immersing the first ends of the plurality of liquid-filtration membranes into the adhesive up to a first length along the first ends;
- applying a quantity of a driver liquid above the quantity of the adhesive in the storage vessel, wherein the driver liquid is less dense than the adhesive, such that a weight of the driver liquid applies a force on the adhesive so as to drive some of the adhesive into an interior of each of the plurality of liquid-filtration membranes up to a second length along the first ends, wherein the second length is greater than the first length;

- removing at least some of the driver liquid from the storage vessel;
- solidifying the adhesive;
- cutting the plurality of liquid-filtration membranes at a point that is between the first length and the second length such that the first ends of the plurality of liquid-filtration membranes are disconnected from one another and are sealed so as to prevent liquid flow therethrough;
- providing a support structure including a header; and
- mounting a second end of each of the plurality of liquid-filtration membranes into the header so as to permit fluid communication between a permeate chamber defined at least in part by the header and the interiors of the plurality of liquid-filtration membranes.

BRIEF DESCRIPTION OF THE DRAWINGS

For a better understanding of the embodiment(s) described herein and to show more clearly how the embodiment(s) may be carried into effect, reference will now be made, by way of example only, to the accompanying drawings.

DETAILED DESCRIPTION

Figures 1, 2:
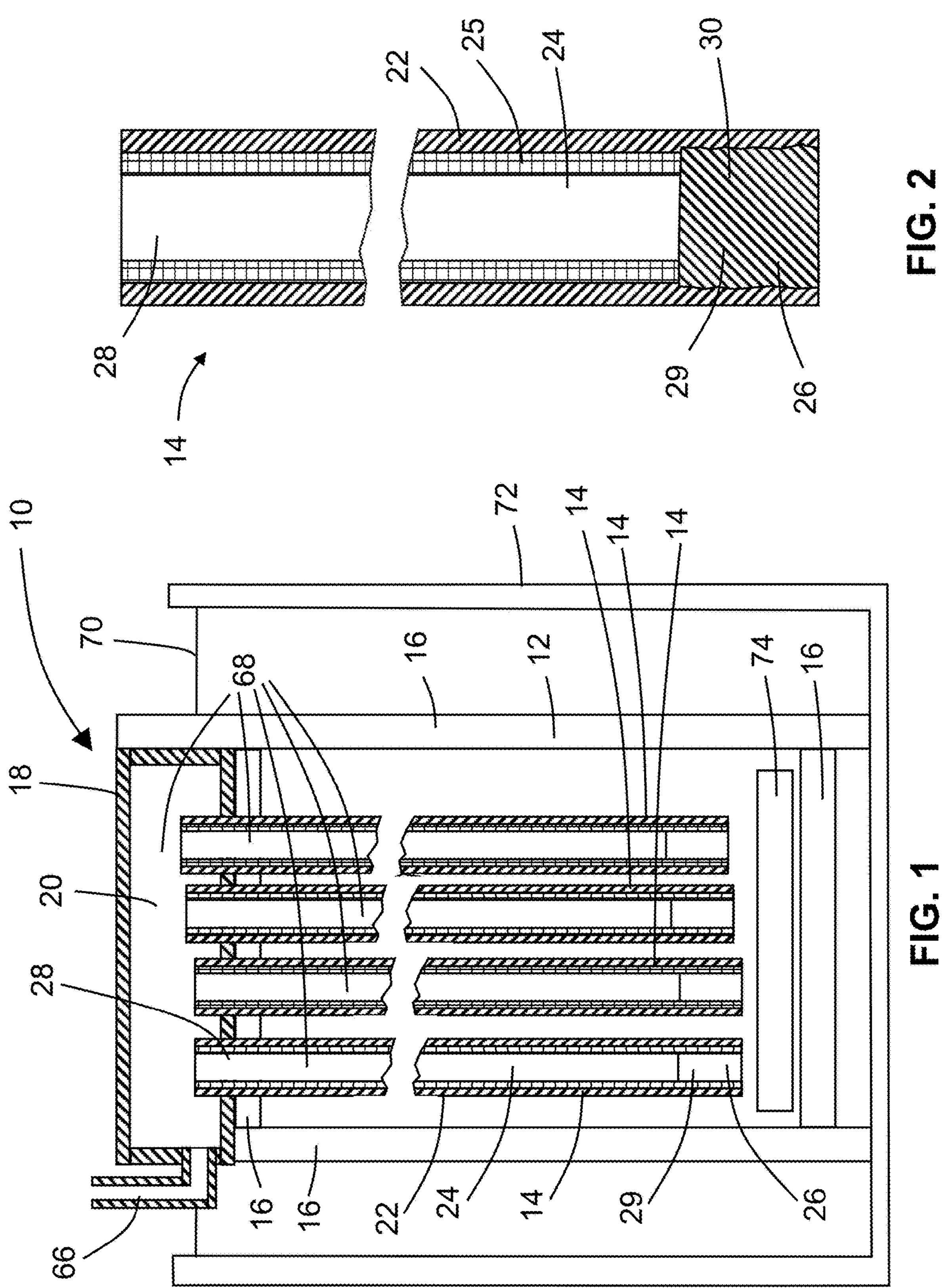
FIG. 1 is a sectional side view of a system for filtering a retentate including a tank and a liquid-filtration membrane module in accordance with an embodiment of the present disclosure.
FIG. 2 is a sectional side view of a liquid-filtration membrane that is part of the liquid-filtration membrane module shown in FIG. 1.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

The terms 'comprising' and 'including' and their various conjugations (e.g. 'comprises') will be understood to be inclusive and open-ended, and not exclusive. This means that if an element A includes or comprises an element B, it will be understood that element A could include or comprise other elements in addition to including or comprising element B. The term 'having' and its various conjugations are also to be understood as being open-ended in the same way as 'comprising' and 'including'. These terms are not to be interpreted to exclude the presence of other features, steps or components.

As used herein, the terms "about" and "approximately" are meant to cover variations that may exist in the upper and lower limits of the ranges of values, such as variations in properties, parameters, and dimensions.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns such that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

As used in this document, "attached" in describing the relationship between two connected parts includes the case in which the two connected parts are "directly attached" with the two connected parts being in contact with each other, and the case in which the connected parts are "indirectly attached" and not in contact with each other, but connected by one or more intervening other part(s) between.

As used in this document, terms describing relative positions of elements such as 'top', 'upper', 'bottom', 'lower', or other analogous terms will be understood to refer to the placement of the described element during use of the apparatus of which it is a part unless the context would make it clear that it is otherwise. It will be understood that the aforementioned placement of an element, for example, can still be considered its placement even when the object that it is a part of is lying in some position other than the position in which it will be used. As an example, if reference is made to a device having an upper member, it will be understood that the upper member is being described as having an upper position when the device that it is a part of is in use or is in position for use, unless the context would make it clear that it is otherwise. Further to this example, it will be understood that the aforementioned upper member of the object can still be considered its upper member even when the object is lying on its side, for storage, or for transport, or for some other reason.

Any method, application or module herein described may be implemented using computer readable/executable instructions that may be stored or otherwise held by a memory, and executed by a processor. Aspects of the present disclosure may be described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor, such that the processor, and a memory storing the instructions, which execute via the processor, collectively constitute a machine for implementing the functions/acts specified in the flowchart and/or block diagram block or blocks.

The flowcharts and functional block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference is made to FIG. 1, which shows a liquid-filtration membrane module 10 in accordance with an embodiment of the present disclosure. The liquid-filtration membrane module 10 includes a support structure 12 and a plurality of liquid-filtration membranes 14. For readability, the liquid-filtration membrane module 10 may simply be referred to as the membrane module 10. The support structure 12 may have any suitable composition. For example, the support structure may include a plurality of structural members 16, and a header 18. The header 18 at least in part defines a permeate chamber 20, for holding permeate from the liquid-filtration membranes 14.

Reference is made to FIG. 2, which shows a magnified sectional view of one of the liquid-filtration membranes 14. In order to fit the liquid-filtration membrane 14 in FIG. 2, the liquid-filtration membrane 14 is shown having a break along its length. The exact length of the liquid-filtration membrane 14 will vary depending on factors related to the specific application for which it will be used.

The liquid-filtration membrane 14 may have a hollow tubular shape, and may thus include a tubular membrane wall 22 that defines an interior 24. The interior 24 may also be referred to as a lumen 24. The interior 24 may have any suitable cross-sectional shape. In the embodiment shown, the interior 24 has a circular cross-sectional shape. The interior 24 may have any suitable size, such as between 0.4-2.0 mm in each of two orthogonal directions. For example, the interior 24 has a cross-sectional dimension of about 1.2-1.3 mm, in each of two orthogonal directions. The tubular membrane wall 22 may be formed from polyvinylidene fluoride (PVDF) or from any other suitable material or mixture of different materials that has a selected permeability to water and which is capable of filtering out contaminants therein. Other suitable materials include polysulfones, and polyethersulfones with or without any other additives. The membrane wall 22 may be formed as one layer, or as a plurality of layers, and may be formed from any single material or any combination of materials.

Optionally, the liquid-filtration membrane 14 may further include a reinforcement structure 25 in the interior 24 to help the membrane wall 22 resist collapse or breakage during operation, and to maintain a selected amount of stiffness to the liquid-filtration membrane 14. The reinforcement structure 25 may be a relatively open structure, so as to permit the easy pass-through of water, and may be formed from any suitable material, such as, for example, polyester. In other embodiments, the reinforcement structure 25 may be on the exterior of the membrane wall 22.

The liquid-filtration membranes 14 each have a first end 26 and a second end 28. The first end 26 of each liquid-filtration membrane 14 is sealed by a seal member 29 so as to prevent liquid flow therethrough. The second end 28 of each of the plurality of liquid-filtration membranes 14 may be mounted into the header 18 so as to permit fluid communication between the permeate chamber 20 and the interiors 24 of the plurality of liquid-filtration membranes 14.

The plurality of liquid-filtration membranes 14 are all sealed at their first ends 26, while their first ends 26 remain separate from one another in the sense that the first ends 26 are freely moveable relative to one another. In other words, the first ends 26 are not connected to one another.

Figure 10:
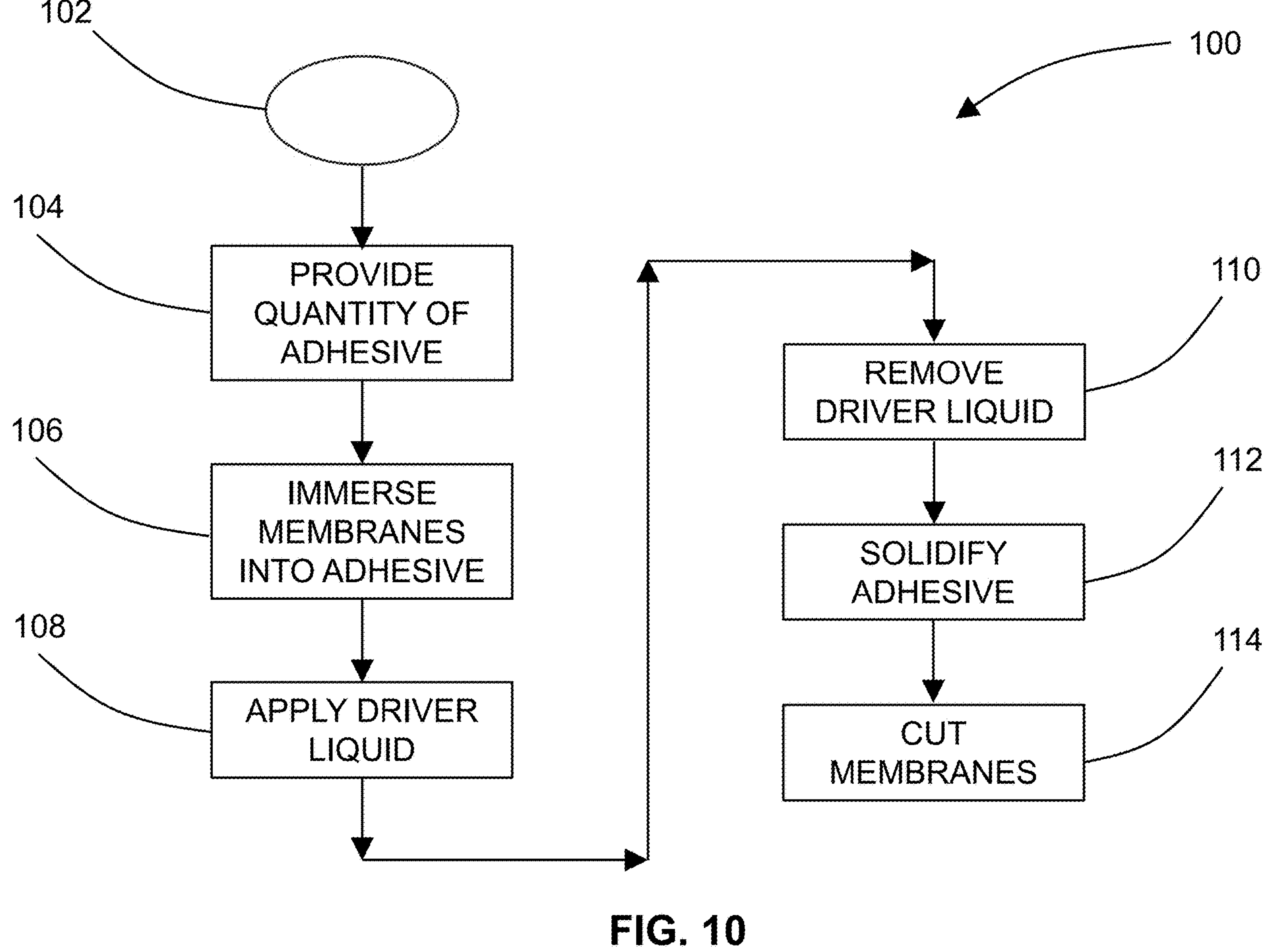
FIG. 10 is a flow diagram of the method for sealing the end of the liquid-filtration membrane shown in FIG. 2.

FIGS. 3-8 illustrate a method for sealing the first end 26 of each of a plurality of liquid-filtration membranes 14. The method is also represented as a flow diagram in FIG. 10, where the method is shown generally at 100. The method 100 starts at starting point 102. Step 104 includes providing a quantity of an adhesive in a storage vessel. The adhesive is shown at 30 in FIG. 3. The storage vessel is shown at 32 in FIG. 3. The storage vessel 32 may be any suitable type of storage vessel such as an open topped vessel, as shown, or alternatively, a tray having a suitable depth.

The adhesive 30 may be any suitable type of adhesive. In an example, the adhesive 30 may be a two-component epoxy resin, with the mixed viscosity of about 800-1200 cp at 20 degrees C. In some embodiments, the adhesive 30 may be a urethane. It is possible that an adhesive with a viscosity of 2000 cp or even 4000 cp at 20 degrees C. would be usable, such as for example, for liquid-filtration membranes 14 that have larger size lumens 24. Additionally, the material of construction of the liquid-filtration membrane 14 can impact what range of viscosities and what choices are best used for the adhesive. It is also possible that adhesives with as low a viscosity as 100 cp could be used, again depending on the size and the material of construction of the liquid-filtration membrane 14.

The adhesive 30 may have any suitable density. In some examples, the adhesive has a density of about 1.1 to about 1.3 g/cm^3. However, the adhesive 30 may have any other suitable density.

Figures 3, 4:
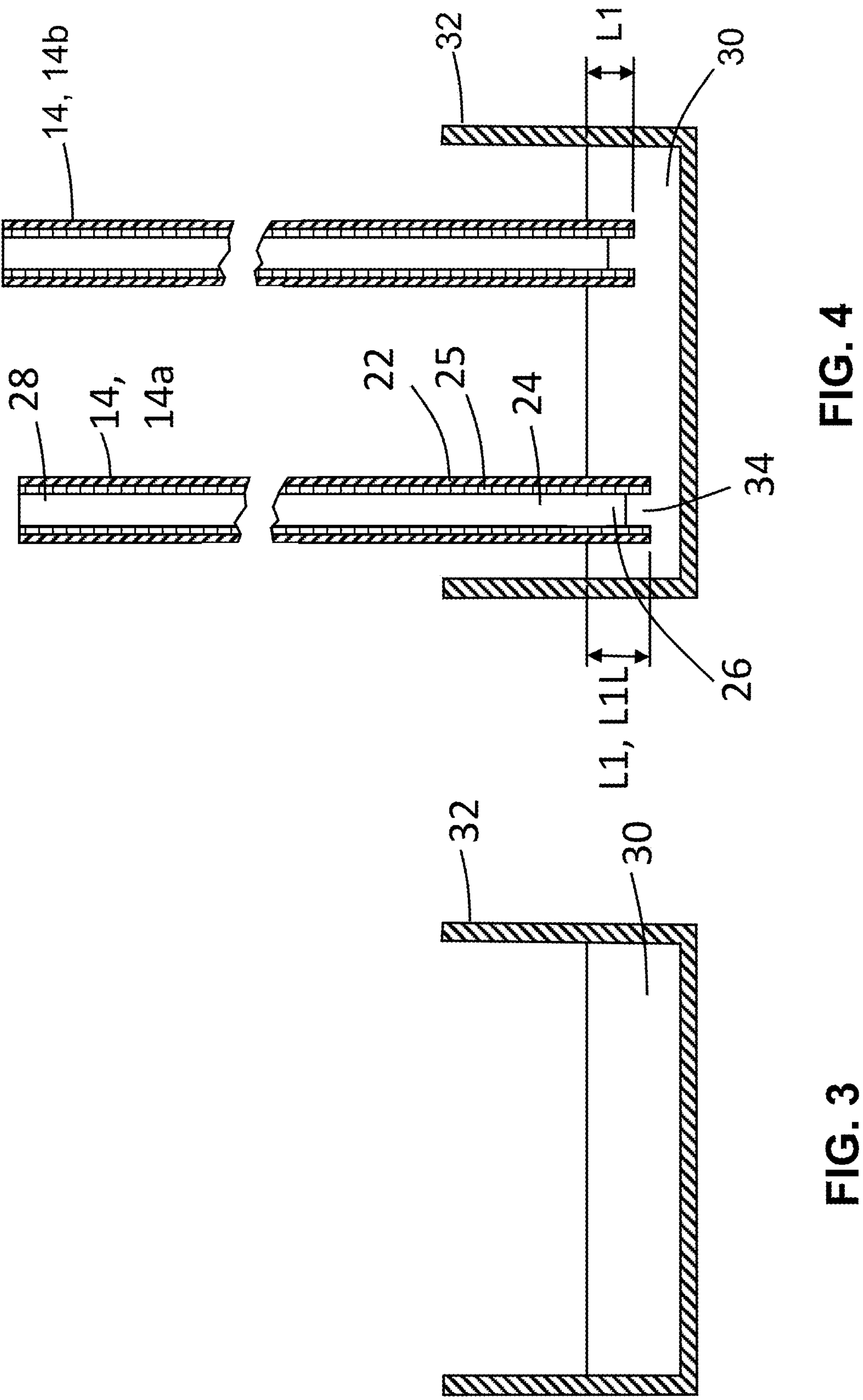
FIG. 3 is a sectional side view of a storage vessel with adhesive, illustrating a first step in sealing an end of the liquid-filtration membrane shown in FIG. 2.
FIG. 4 is a sectional side view of the storage vessel and the adhesive, and a plurality of liquid-filtration membranes, illustrating a second step in sealing an end of the liquid-filtration membrane shown in FIG. 2.

Step 106 includes immersing the first ends 26 of the plurality of liquid-filtration membranes 14 into the adhesive 30 up to a first length shown at L1 along the first ends 26. This step is illustrated in FIG. 4. In FIG. 4, only two liquid-filtration membranes 14 are shown (shown individually at 14*a* and 14*b*), however, if will be understood that any suitable number of liquid-filtration membranes 14 may be immersed in the adhesive 30. For greater certainty, it will be understood that the first length L1 need not be precisely the same length on every one of the liquid-filtration membranes 14. As shown in FIG. 4, the first length L1 for the liquid-filtration membrane 14*a* is a bit greater than the first length L1 for the liquid-filtration membrane 14*b*, which reflects that the liquid-filtration membrane 14*a* is immersed a bit deeper into the adhesive 30 than is the liquid-filtration membrane 14*b*. In an alternative wording, it may be said that the plurality of liquid-filtration membranes 14 are immersed in the adhesive 30 up to a range of first lengths L1, the range of first lengths L1 having a largest first length L1L. In the example shown in FIG. 4, the largest first length L1L is the first length L1 for the liquid-filtration membrane 14*a*.

As shown in FIG. 4, the adhesive 30 may enter into the lumen 24 of the liquid-filtration membrane 14 through the opening shown at 34 at the tip of the first end 26. However, due to various factors, including the viscosity of the adhesive 30, surface tension of the materials and the cross-sectional area of the lumen 24, the penetration of the adhesive 30 into the lumen 24 may be relatively small.

Figures 5, 6:
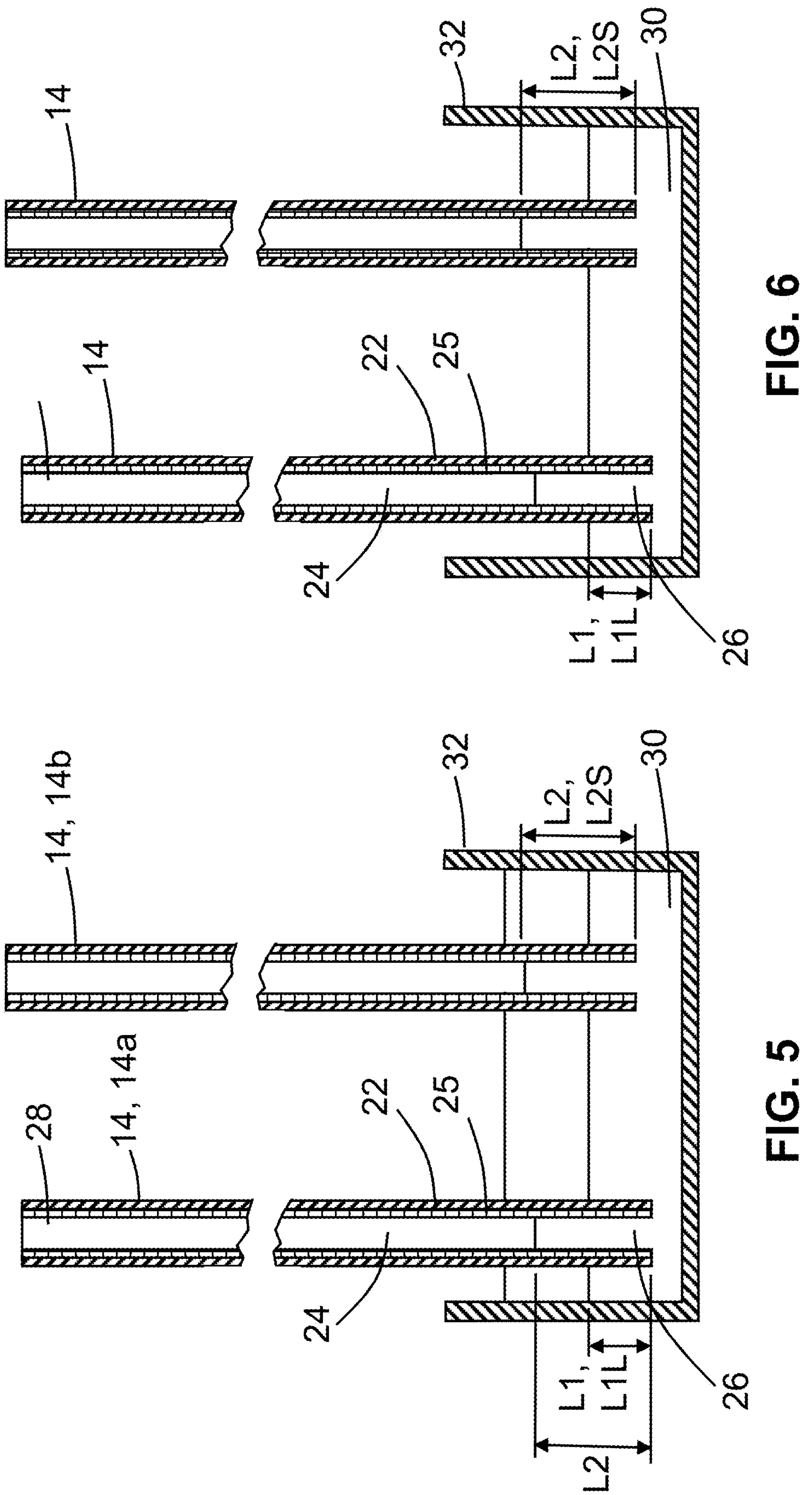
FIG. 5 is a sectional side view of the storage vessel, the adhesive, and the plurality of liquid-filtration membranes, and a driver liquid on top of the adhesive, illustrating a third step in sealing an end of the liquid-filtration membrane shown in FIG. 2.
FIG. 6 is a sectional side view of the storage vessel, the adhesive, and the plurality of liquid-filtration membranes, illustrating a fourth step in sealing an end of the liquid-filtration membrane shown in FIG. 2.

Step 108 is illustrated in FIG. 5, and includes applying a quantity of a driver liquid 36 above the quantity of the adhesive 30 in the storage vessel 32. The driver liquid 36 has a density that is lower than the density of the adhesive 30, and remains separate from the adhesive 30. The driver liquid 36 has a weight and thus applies a force on the adhesive 30, thereby driving the adhesive 30 to penetrate further into the lumens 24 of the liquid-filtration membranes 14 up to a second length L2 along the first ends 26. The second length L2 is greater than the first length L1. The viscosity of the adhesive 30 must be low enough that the adhesive 30 can penetrate through the reinforcement structure 25, in order to engage and bond with the membrane wall 22. In some embodiments, the adhesive may penetrate into the membrane wall 22 by some amount, as illustrated in FIG. 2.

For greater certainty, it will be understood that the second length L2 need not be precisely the same length on every one of the liquid-filtration membranes 14. As shown in FIG. 5, the second length L2 for the liquid-filtration membrane 14*b* is a bit smaller than the second length L2 for the liquid-filtration membrane 14*b*, which reflects that the liquid-filtration membrane 14*b* is immersed a bit less deeply into the adhesive 30 than is the liquid-filtration membrane 14*a*. In an alternative wording, it may be said that the driver liquid 36 has a weight and thus applies a force on the adhesive 30, thereby driving the adhesive 30 to penetrate further into the lumens 24 of the liquid-filtration membranes 14 up to a range of second lengths L2, the range of second lengths L2 having a smallest second length L2S. In the example shown in FIG. 4, the smallest second length L2S is the second length L2 for the liquid-filtration membrane 14*b*. The smallest second length L2S is greater than the largest first length L1L.

In order to facilitate knowing how far along the lumen 24 the adhesive 30 has reached, the membrane wall 22 of the liquid-filtration membrane 14 may optionally be light transmissive, and the adhesive 30 may be of a colour that renders the adhesive 30 in the interiors of the liquid-filtration membranes 14 visible through the membrane wall 22 from outside the liquid-filtration membranes. For greater certainty, the liquid-filtration membrane 14 need not be transparent. It needs only to be sufficiently light transmissive that a person could tell where the adhesive 30 reached within the lumen 24. Other detection methods may alternatively be used instead of visual examination using light transmissive lfms 14 and an adhesive 30 that is visible to the unaided eye inside the lumen 24 from outside the lfm 14. For example, one could use trial and error, by which the exact amounts are determined by visual examination of lfms 14 that are cut to determine whether they are properly sealed and to ensure that the lfms 14 are separated from each other.

The driver liquid 36 may be any suitable liquid, such as, for example a paraffin oil. The density of paraffin oil may be about 0.827 to about 0.89 g/cm^3, however, as noted above, any suitable liquid may be used that has a density that is lower than that of the adhesive 30. The viscosity of the driver liquid 36 may vary widely. The driver liquid 36 may have a viscosity of about 20 to 5000 cp or more at 20 degrees C. In embodiments in which the driver liquid 36 is a paraffin oil, the driver liquid 36 may have a viscosity of about 30 to about 40 cp at 20 degrees C.

The driver liquid 36 is non-adhesive in the sense that it will not permanently adhere the liquid-filtration membranes 14 to one another, and therefore it permits the liquid-filtration membranes 14 to freely move relative to one another.

In a subsequent step 110, the driver liquid 36 is removed from the storage vessel 32, as illustrated in FIG. 6. Worded more broadly, at least some of the driver liquid 36 is removed from the storage vessel 32. In the embodiment shown, substantially all of the driver liquid 36 is removed from the storage vessel 32, however it will be understood that some small amount of the driver liquid 36 may remain in the storage vessel, in contact with elements such as the wall of the storage vessel, the adhesive, and the exteriors of the liquid-filtration membranes 14.

Figures 7, 8:
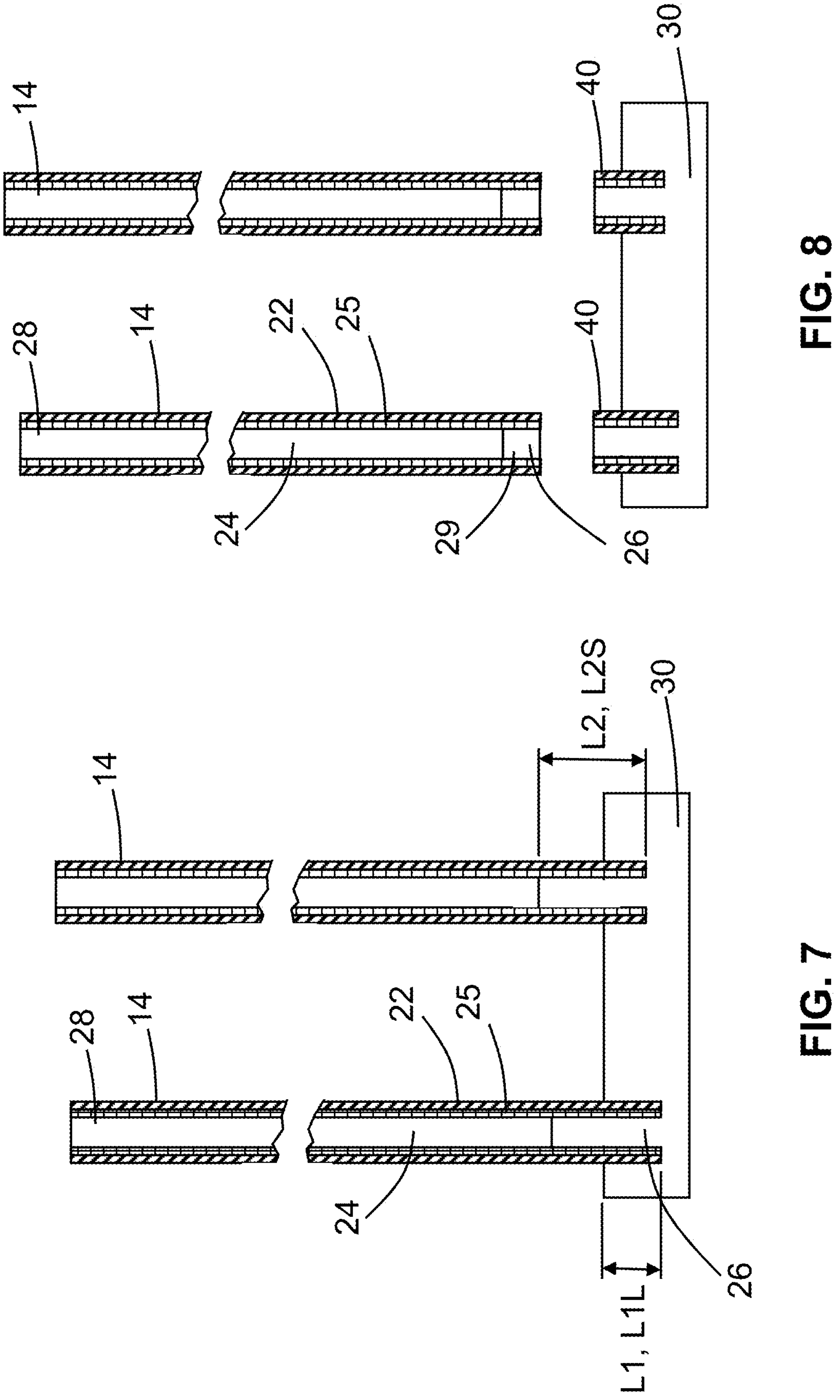
FIG. 7 is a sectional side view of the adhesive, and the plurality of liquid-filtration membranes, illustrating a fifth step in sealing an end of the liquid-filtration membrane shown in FIG. 2.
FIG. 8 is a sectional side view of the adhesive, and the plurality of liquid-filtration membranes, illustrating a sixth step in sealing an end of the liquid-filtration membrane shown in FIG. 2.

Step 112, which is illustrated in FIG. 7, the adhesive 30 is solidified (e.g. cured) and the liquid-filtration membranes 14 and the solidified adhesive 30 are removed from the storage vessel 32. It will be noted that it is not strictly necessary to remove the liquid-filtration membranes 14 and the solidified adhesive 30 from the storage vessel 32 after solidifying the adhesive 30. Some of the solidified adhesive 30 is present in the first ends 26 of the liquid-filtration membranes 14.

In step 114, which is illustrated in FIG. 8, includes cutting the plurality of liquid-filtration membranes 14 at a length that is between the first length L1 and the second length L2. As a result, the first ends 26 of the liquid-filtration membranes 14 are disconnected from one another and are therefore freely movable relative to one another, since the exteriors of the now-shortened first ends 26 were only in contact with the driver liquid 36. Furthermore, the first ends 26 contain an amount of solidified adhesive 30, thereby forming the seal members 29. Using the alternative wording, step 114 includes cutting the plurality of liquid-filtration membranes 14 at a length that is between the largest first length L1L and the smallest second length L2S such that the first ends 26 of the liquid-filtration membranes 14 are disconnected from one another and are therefore freely movable relative to one another.

As can be seen, an end portion shown at 40 of each of the liquid-filtration membranes 14 remains connected to the solidified adhesive 30. These end portions 40 may be discarded or used for any other suitable purpose.

It is preferable that L1 (or L1L if considering it using the alternative wording) and L2 (or L2S if considering it using the alternative wording) be selected such that the smallest amount of length of the resulting seal members 29 is in the range of about 5 mm to about 40 mm. In some embodiments the length of the seal members 29 may be about 20 mm.

Figure 9:
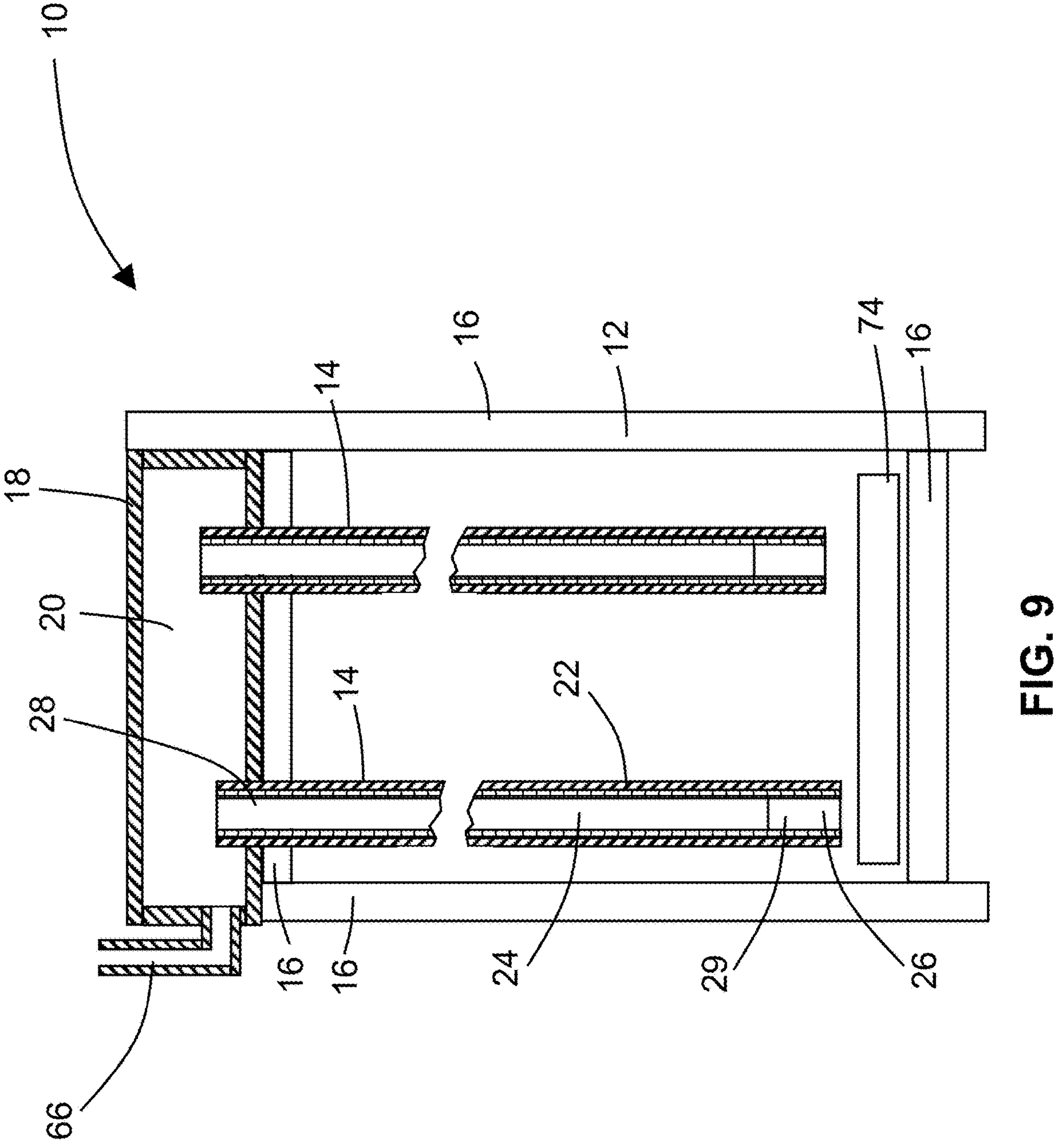
FIG. 9 is a sectional side view of a membrane module, illustrating several steps in producing the liquid-filtration membrane module shown in FIG. 1.
Figure 11:
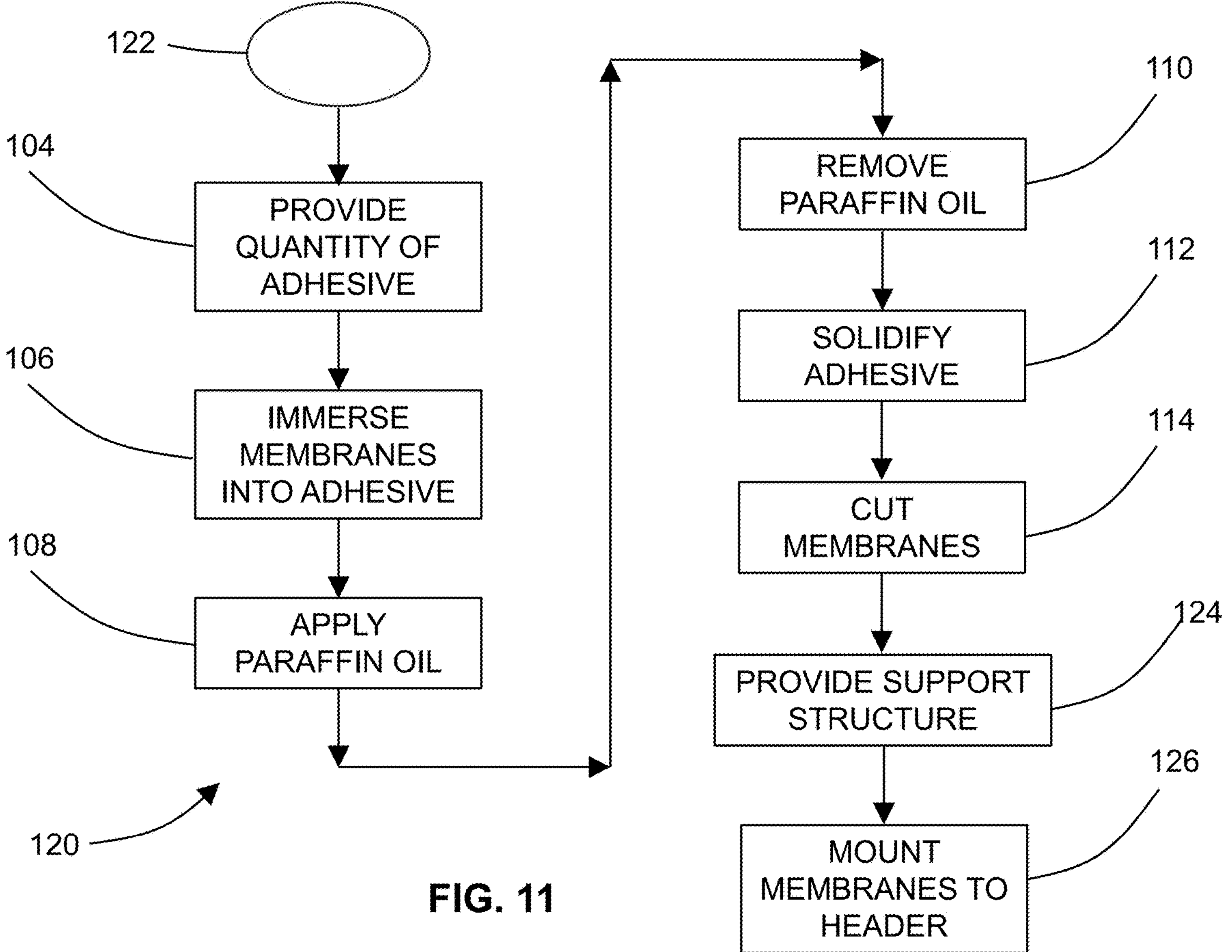
FIG. 11 is a flow diagram of the method for producing a liquid-filtration membrane module shown in FIG. 2.

At this point the liquid-filtration membranes 14 are ready for use in further assembling the liquid-filtration membrane module 10. FIG. 9 illustrates method steps that can be taken to further assemble the liquid-filtration membrane module 10. The method itself is shown at 120 in FIG. 11. The method 120 may start at start 122. The method 120 may include steps 104, 106, 108, 110, 112 and 114, described above. The method 120 may further include step 124, which is providing the support structure 12 with the header 14. The support structure 12 may be made from any suitable materials, such as, for example, suitable metals, suitable structural polymers, and/or composite materials. The support structure 12 may be made from tubular shapes, and/or other elements. The support structure 12 is shown in FIG. 9 (and in FIG. 1) as a simple arrangement of rectangular forms, however, it will be understood that it may have any suitable configuration.

The method 120 further includes step 126 which includes mounting the second end 28 of each of the plurality of liquid-filtration membranes 14 into the header 18 so as to permit fluid communication between a permeate chamber 20 defined at least in part by the header 18 and the interiors 24 of the plurality of liquid-filtration membranes 14. As a result, and as shown in FIG. 1, the header 18 collects permeate from the plurality of liquid-filtration membranes 14. The header 18 has a header outlet shown at 66, for the transport of permeate away from the membrane module 10. The permeate is shown at 68.

FIG. 1 shows the membrane module 10 in a tank of liquid to be filtered, referred to as concentrate, or retentate. Typically the retentate is water with contaminants to be removed. The retentate is shown at 70. The tank in which the retentate 70 is filled, is shown at 72.

In operation, once the tank 72 is filled sufficiently, a pressure differential is generated across the liquid-filtration membranes 14 such that the liquid pressure in the tank 72 is greater than the pressure in the lumens 24 of the liquid-filtration membranes 14. As a result, purified water permeates through the membrane walls 22 of the liquid-filtration membranes 14 into the lumens 24. The water (referred to as the permeate 68) collects in the header 18 and is drawn out from the header 18 through the header outlet 66 to a collection point. Since the first ends 26 of the liquid-filtration membranes 14 are sealed by the seal members 29, and the second ends 28 of the liquid-filtration membranes 14 are sealed by their connection to the header 18, water must enter the liquid-filtration membranes 14 by passing through the membrane wall 22.

During operation, contaminants in the retentate 70 collect on the exterior surfaces of the liquid-filtration membranes 14, which can foul the liquid-filtration membranes 14 and hinder their operation. Optionally, the method 120 further includes mounting an aerator 74 to the support structure 12, so as to be positioned underneath the bottom ends of the liquid-filtration membranes 14. The aerator 74 is configured for fluid communication with a gas source (not shown). The aerator 74 is used to release bubbles of gas that rise through the retentate 70 alongside the liquid-filtration membranes 14. The bubbles help clean off the contaminants from the exterior surface of the liquid-filtration membranes 14.

The aerator 74 is represented in FIGS. 1 and 9 as a simple rectangle, however, it will be known to those of skill in the art what a suitable the configuration for the aerator 74 would be.

The pressure differential across the liquid-filtration membranes 14 may be generated by drawing a negative pressure in the lumens 24 of the liquid-filtration membranes 14. Alternatively, the pressure differential may be generated by pressurizing the retentate 70 in the tank 72. In such an embodiment, the tank 72 may be in the form of a housing around the membranes that can be pressurized. This configuration is known as a pressurized module configuration.

In the embodiment shown, the bottom ends of the liquid-filtration membranes 14 are the first ends 26. However, in another embodiment, the header 18 may be positioned proximate the bottom of the support structure 12 and the liquid-filtration membranes 14 may be oriented so as to have their second ends 28 (which are mounted to the header 18) as the bottom ends and the first ends 26 as their top ends. The liquid-filtration membranes 14 in such embodiments are flexible but sufficiently stiff that they remain relatively upright during operation, particular as they are together as a bundle in close proximity to one another. In this case the support frame may include a portion that surrounds the bundle at one or more selected points along the length of the bundle, in order to ensure that the lfms 14 remain in an upright orientation during use.

While only two liquid-filtration membranes 14 are shown in the storage vessel 32 in FIGS. 4-6, it will be noted that there may be many liquid-filtration membranes 14 in the storage vessel, all in a bundle, with a selected packing density, so as to reduce the amount of adhesive 30 that is used in the end sealing operation. It will be noted that the packing density of the bundle of liquid-filtration membranes 14 that are immersed in the storage vessel 32 impacts the viscosity of the driver liquid 36 that is needed to ensure that the driver liquid 36 can reach in between all the liquid-filtration membranes 14 so as to apply a suitable force on the adhesive 30 below it. In general, the higher the packing density of the liquid-filtration membranes 14 in the storage vessel 32, the lower the viscosity of the driver liquid 36 needs to be, particularly when the packing density of the liquid-filtration membranes 14 is high so as to restrict the migration of the driver liquid 36.

Furthermore, while only two liquid-filtration membranes 14 are shown in the membrane module 10 shown in FIG. 9, and only four are shown in the membrane module 10 shown in FIG. 1, it will be noted that the number of liquid-filtration membranes 14 in the membrane module 10 may be high, such that the liquid-filtration membranes 14 assist one another in remaining relatively straight, whether they are hanging from the header 18 (as shown in FIG. 1) or whether they extend upwards from the header 18.

The embodiments of the disclosures described herein are exemplary (e.g., in terms of materials, shapes, dimensions, and constructional details) and do not limit by the claims appended hereto and any amendments made thereto. Persons skilled in the art will appreciate that there are yet more alternative implementations and modifications possible, and that the following examples are only illustrations of one or more implementations. The scope of the disclosure, therefore, is only to be limited by the claims appended hereto and any amendments made thereto.

What is claimed is:

1. A method for sealing a first end of each of a plurality of liquid-filtration membranes, wherein the liquid-filtration membranes each have a hollow tubular shape, the method comprising:

providing a quantity of an adhesive in a storage vessel;

immersing the first ends of the plurality of liquid-filtration membranes into the adhesive up to a first length along the first ends;

applying a quantity of a driver liquid above the quantity of the adhesive in the storage vessel, wherein the driver liquid is less dense than the adhesive, such that a weight of the driver liquid applies a force on the adhesive so as to drive some of the adhesive into an interior of each of the plurality of liquid-filtration membranes up to a second length along the first ends, wherein the second length is greater than the first length;

removing at least some of the driver liquid from the storage vessel;

solidifying the adhesive; and cutting the plurality of liquid-filtration membranes at a point that is between the first length and the second length such that the first ends of the plurality of liquid-filtration membranes are disconnected from one another.

2. A method as claimed in claim 1, further comprising removing the liquid-filtration membranes and the adhesive from the storage vessel after the solidifying step and before the cutting step.

3. A method as claimed in claim 1, wherein the adhesive is an epoxy.

4. A method as claimed in claim 3, wherein the driver liquid is a paraffin oil.

5. A method as claimed in claim 1, wherein the liquid-filtration membranes include a membrane wall defining the interior and a reinforcement member positioned in the interior.

6. A method as claimed in claim 1, wherein the liquid-filtration membranes include a membrane wall that is light transmissive and wherein the adhesive is of a colour that renders the adhesive in the interiors of the liquid-filtration membranes visible through the membrane wall from outside the liquid-filtration membranes.

7. A method of claimed in claim 1, wherein the driver liquid is non-adhesive.

8. A method for making a membrane module for use in liquid filtration, the method comprising:

providing a quantity of an adhesive in a storage vessel;

immersing first ends of a plurality of liquid-filtration membranes into the adhesive up to a first length along the first ends;

applying a quantity of a driver liquid above the quantity of the adhesive in the storage vessel, wherein the driver liquid is less dense than the adhesive, such that a weight of the driver liquid applies a force on the adhesive so as to drive some of the adhesive into an interior of each of the plurality of liquid-filtration membranes up to a second length along the first ends, wherein the second length is greater than the first length;

removing at least some of the driver liquid from the storage vessel;

solidifying the adhesive;

cutting the plurality of liquid-filtration membranes at a point that is between the first length and the second length such that the first ends of the plurality of liquid-filtration membranes are disconnected from one another and are sealed so as to prevent liquid flow therethrough;

providing a support structure including a header; and mounting a second end of each of the plurality of liquid-filtration membranes into the header so as to permit fluid communication between a permeate chamber defined at least in part by the header and the interiors of the plurality of liquid-filtration membranes.

9. A method as claimed in claim 8, wherein, after the mounting step, the second ends of the plurality of liquid-filtration membranes are top ends of the plurality of liquid-filtration membranes, and wherein the first ends of the plurality of liquid-filtration membranes are bottom ends of the plurality which are freely movable relative to one another.

10. A method as claimed in claim 8, further comprising removing the liquid-filtration membranes and the adhesive from the storage vessel after the solidifying step and before the cutting step.

11. A method as claimed in claim 8, wherein the adhesive is an epoxy.

12. A method as claimed in claim 11, wherein the driver liquid is a paraffin oil.

13. A method as claimed in claim 8, wherein the liquid-filtration membranes include a membrane wall defining the interior and a reinforcement member positioned in the interior.

14. A method as claimed in claim 8, wherein the liquid-filtration membranes include a membrane wall that is light transmissive and wherein the adhesive is of a colour that renders the adhesive in the interiors of the liquid-filtration membranes visible through the membrane wall from outside the liquid-filtration membranes.

15. A method of claimed in claim 8, wherein the driver liquid is non-adhesive.

* * * * *